United States Patent [19]

Hackman

[11] Patent Number: 5,571,628
[45] Date of Patent: Nov. 5, 1996

[54] METAL FIBER PREFORMS AND METHOD FOR MAKING THE SAME

[75] Inventor: Lloyd E. Hackman, Worthington, Ohio

[73] Assignee: Ribbon Technology Corporation, Gahanna, Ohio

[21] Appl. No.: 96,518

[22] Filed: Jul. 23, 1993

[51] Int. Cl.$^6$ .................................................. B23P 17/06
[52] U.S. Cl. ........................ 428/605; 428/542.8; 428/34.4
[58] Field of Search ............................... 19/296; 28/116; 428/605, 542.8, 34.4

[56] References Cited

U.S. PATENT DOCUMENTS

| | | | |
|---|---|---|---|
| 2,677,955 | 5/1954 | Constantinesco | 70/50 |
| 3,429,094 | 2/1969 | Romulardi | 52/659 |
| 3,808,085 | 4/1974 | Givens, Jr. | 161/59 |
| 3,895,665 | 7/1975 | Heling et al. | 152/357 |
| 3,906,550 | 9/1975 | Rostoker | 623/16 |
| 3,986,885 | 10/1976 | Lankard | 106/99 |
| 4,101,335 | 7/1978 | Barrable | 106/99 |
| 4,159,361 | 6/1979 | Schupak | 428/240 |
| 4,339,289 | 7/1982 | Lankard | 156/91 |
| 4,366,255 | 12/1982 | Lankard | 501/95 |
| 4,513,040 | 4/1985 | Lankard | 428/49 |
| 4,617,219 | 10/1986 | Schupack | 428/113 |
| 4,778,718 | 10/1988 | Nicholls | 428/287 |
| 4,809,404 | 3/1989 | Lasenga | 19/106 R |
| 4,813,472 | 3/1989 | Hackman et al. | 164/463 |
| 4,876,151 | 10/1989 | Eichen | 428/446 |
| 4,930,565 | 6/1990 | Hackman et al. | 164/463 |
| 5,030,502 | 7/1991 | Teare | 428/143 |
| 5,124,198 | 6/1992 | Koskenmaki et al. | 428/285 |
| 5,178,941 | 1/1993 | Wu | 428/309.9 |
| 5,296,187 | 3/1994 | Hackman | 264/257 |

*Primary Examiner*—Christopher W. Raimund
*Attorney, Agent, or Firm*—Thompson Hine & Flory P.L.L.

[57] ABSTRACT

A preform useful in forming fiber reinforced cementitious composites is disclosed. The preform consists of a free-standing network of metal fibers. In one embodiment, the preform has a shape which bounds a substantial non-interstitial volume devoid of fibers such as a ladle lip ring or an I-beam. The amount of fibers in the preform ranges from about 1 to 10 percent by volume.

7 Claims, No Drawings

METAL FIBER PREFORMS AND METHOD FOR MAKING THE SAME

FIELD OF THE INVENTION

The present invention relates to a method for manufacturing a cement-permeable fiber preform useful in forming fiber reinforced cementitious composites.

BACKGROUND OF THE INVENTION

Fiber reinforced composites are known in the art and described in U.S. Pat. Nos. 4,617,219; 4,366,255; 2,677,955; and 4,668,548.

Conventionally, cementitious composites are made by shipping the reinforcing fibers to the job site where the fibers are either directly mixed with the cement, mortar, or concrete and poured into a mold or the fibers are placed into a mold and infiltrated with a cement composition. Because, as explained in the reference patents, only about 2% by volume fiber can be incorporated into a cementitious composition when the fibers are mixed with the composition directly, the latter practice is preferred. To facilitate this practice, it is known to make the fibers into a mat and to place the mats into a mold. However, the practice remains undesirable because it is labor intensive and the amount of fiber used is difficult to control as it will depend on the degree to which the fibers are compacted, which can vary from worker to worker.

It is known to manufacture metal fiber in mats and to use these mats on the job site to make reinforced cementitious structures. In the methods described in the above patents, the fibers are in any desired size. The fibers may be formed into a continuous fiber mat by directing the fibers onto a conveyor belt apparatus. The fiber mat may be placed into a form or cavity and then infiltrated with a cementitious composition or it may be transported to the job site and deposited into a cavity, and then infiltrated with a cementitious composition.

In addition to being labor intensive, this also requires maintenance of a large fiber or fiber mat inventory at the job site. This invention limits the step of having the purchaser build a form which corresponds to a desired composite's shape and lay the fibers into the form to make a cementitious structure having the desired shape. With this invention, the purchaser need only enclose a fiber preform, which can be manufactured to contain a predetermined volume percentage fiber, in a mold and infiltrate the preform with cementitious composition. Furthermore, the fiber preform can have any predetermined dimension and shape. Instead of a mat having a thickness of 2 to 4 inches, the preform can take on any desired shape, for example, a column, a cube or even a ladle lip ring. A desired and more efficient manner now exists to fabricate a reinforced member that can be used with a cementitious composition.

SUMMARY OF THE INVENTION

The present invention is directed to a method for manufacturing a cement-permeable fiber preform having a predetermined, discrete size, shape, and volume percent fiber that is useful in forming fiber reinforced cementitious composites. The method comprises the steps of: preparing metal fibers, assembling a mold that defines a discrete space corresponding to the size and shape of the fiber preform, conveying the fibers from the point of their preparation into the mold, compressing the fibers in the form to obtain the desired fiber density or volume percent within the form, and transporting the preform to the job site.

In this embodiment of the present invention, the fiber preform is free-standing and removed from the mold for shipment to the job site. Upon arrival at the job site, workers position the fiber preform in a mold and introduce a cementitious composition which infiltrates the fiber preform and forms a fiber reinforced cementitious composite.

DEFINITIONS

The term "fiber preform" as used herein means a fiber network having a discrete, predetermined shape corresponding to the shape of a discrete product. This term does not include fiber networks of undetermined size or shape or of undetermined dimensions such as a continuous fiber mat.

The term "fiber free volume" as used herein refers to a non-interstitial volume which is devoid of fibers. For example, an I-beam has a fiber free volume in the space bounded by the horizontal and vertical sections of the beam. A box has a fiber free volume bounded by the walls and floor of the box.

The term "non-woven" as used herein means that the fibers forming the preform are not systematically woven. The preform is held together by random entanglement of the fibers.

The term "free-standing" means the preform is self standing apart from any form.

The term "effective diameter" is used herein as it is in the art, namely, to mean the diameter of a circle the area of which is equal to the cross-sectional area of the fiber element.

DETAILED DESCRIPTION OF THE INVENTION

To prepare the metal fibers, the methods described in U.S. Pat. Nos. 4,813,472 and 4,930,565 to Ribbon Technology Corporation may be used. These patents disclose the production of metal filamentary materials ranging from a size less than 1 inch up to semi-continuous fibers. The fibers are drawn from the molten metal using a melt over flow or melt extraction technique. Other methods may be used to prepare fibers. For example, slit sheet processes and milling processes may be used. The preferred fiber length will vary depending upon the properties required in the composite. The fibers may range from as small as approximately ¾ of an inch to as long as continuous fibers. However, because shorter fibers can often be mixed directly into a cement composite and used effectively, the present invention is particularly useful with fibers greater than about 1 inch and still more particularly greater than about 3 inches. For many applications, the fibers range from 6 to 12 inches long and, more particularly, about 9 inches long. The fibers may also be continuous.

Typically, the fibers are steel fibers such as carbon steel, stainless steel or manganese steel. Stainless steel fibers are preferred for refractory applications. The fibers commonly range in effective diameter from about 0.004 to 0.060 inch and, more preferably, from approximately 0.010 to 0.025 inch. These fibers have an aspect ratio (length/diameter) ranging from 50 for ¾ inch fibers to near infinite for continuous fibers. Smaller diameter fibers are shown to provide higher energy absorption capacity.

The fibers typically are non-circular in cross-section and have thickness and width dimensions. For example, they range from about 0.02 to 0.08 inch in width and from 0.005 to 0.015 inch in thickness. A fiber having a circular cross-section is also useful, but non-circular fibers are more commonly available and often less expensive. Depending upon the strength of the fibers they may be corrugated. However, for smaller diameter wires most commonly used (e.g., 0.010 or 0.020 inch) corrugation is generally not desirable under tensile stress. The corrugation tends to be pulled out of the wire. As the corrugation is pulled out of the wire, the wire strength does not reinforce the concrete and the concrete cracks or fails.

The fibers are blown from their point of manufacture into a chute where they are air laid into a mold in a non-woven manner, and compressed into a preform. By controlling the rate of production or delivery of the fibers (pounds/min), and the extent of compression of the preform, the density of the preform can be controlled. The fibers are compressed either by hand or by machine in the mold. The amount of fiber in the preform and the cementitious composite made from the preform may range from about 1 to 10 percent by volume. In order to incorporate more than 10% fiber into a composite, the preform must be compressed to an extent that it cannot readily be infiltrated with a cementitious mixture. Typically, composites made from the fiber preforms of this invention contain about 2 to 6% by volume fiber.

Fibers may be randomly oriented in the preform or oriented to maximize the strength of the preform in a selected direction. For example, the preform fibers may be oriented parallel to the directions in which the structural member will encounter its principal tensile stress. Regardless of their orientation, the fibers are not woven in a systematic manner. In many applications, due to the geometry of the preform, the fibers will assume some degree of orientation. Depending on the shape of the preform, the fibers will be oriented generally perpendicular to the thickness or Z-direction of the structure and parallel to the X-Y plane of the structure. Within the X-Y plane, the fibers may assume a parallel or random alignment.

The molds used to define the preforms may be of any discreet size or shape, and are usually made to the specification of the prospective purchaser of the preform. These shapes include conventional shapes such as rectangles, squares and columns. They also include shapes which have a fiber free volume such as hollow cylinders, ladle lip rings, railroad ties, containers and I-beams.

The fibers are placed into the mold. The weight of the fibers in the mold is determined from the density required in the final preform. This density ranges from about 1 to 10 percent by volume as previously described. The fibers are then compressed either by hand or by machine in the mold.

Once the fibers have been compacted, the preform is then removed from the mold and made ready for shipment to the purchaser. The preform is shipped to the job site without being infiltrated with a cementitious slurry.

The cementitious compositions which may be used with the present invention include hydraulic and polymer cements. Mortar and concrete compositions are also useful. Representative examples of useful cements include Portland Cement, calcium aluminate cement, and magnesium phosphate cement. The cementitious compositions must have a consistency which will allow them to easily penetrate and encapsulate the metal fibers. Preferably, they are a free-flowing liquid. Useful aggregates may range up to about 30 mesh (0.023 inch) so they are not strained from the composition as they impregnate the preform. Examples of aggregates include sand and small gravels. The free-flowing liquid has a ratio by weight of water to cement in the range of about 0.35 to 0.5, and, preferably, about 0.37 to 0.40.

A superplasticizing agent may be added to the cementitious composition to better enable it to infiltrate the fibers and fill the preform. The superplasticizing agent is not required but is preferred. Without the superplasticizing agent, more water must be added to the cementitious composition to infiltrate the fibers. Superplasticizing agents are known and have been used in flowing concrete and water-reducing, high-strength concrete. See, e.g., "Superplasticized Concrete," ACI Journal, May, 1988, pp. N6–N11 and "Flowing Concrete," Concrete Costr., Jan. 1979, pp. 25–27. The most common superplasticizing agents are sulfonated melamine formaldehyde and sulfonated naphthalene formaldehyde. Superplasticizing agents used with the present invention are those which enable the aqueous cementitious composition to fully infiltrate the packed fibers. Of the superplasticizing agents that are commercially available, Mighty 150, a sulfonated naphthalene formaldehyde available from ICI is preferred.

Having described the invention in detail and by reference to preferred embodiments thereof, it will be apparent that modifications and variations may be made without departing from the scope of the invention.

What is claimed is:

1. A preform useful in forming fiber reinforced cementitious composites, said preform consisting of a free-standing network of metal fibers, said network of metal fibers having a shape which bounds a substantial non-interstitial volume devoid of fibers wherein the amount of fibers in the preform ranges from about 1 to 10 percent by volume.

2. The preform of claim 1 wherein the fibers have an effective diameter of 0.004 to 0.060 inch, a length greater than 3 inches, and an aspect ratio greater than 200.

3. The preform of claim 2 wherein the fibers are approximately 6 to 12 inches long.

4. A metal fiber reinforced cementitious composite made by a process comprising the steps of:

(a) preparing metal fibers;

(b) providing a mold defining a space corresponding to a predetermined, discrete size and shape;

(c) placing the fibers in the mold;

(d) compressing the fibers into the mold to obtain a mold-defined preform;

(e) removing the mold-defined preform from the mold; and (f) infiltrating the mold-defined preform with a cementitious composition, wherein the mold-defined preform comprises from 1 to 10 percent by volume of fiber and wherein the mold-defined preform has a thickness greater than 4 inches.

5. A mold-defined preform useful in preparing fiber reinforced composites wherein said preform is prepared by the steps of:

(a) preparing metal fibers;

(b) providing a mold defining a space corresponding to a predetermined, discrete size and shape;

(c) placing the fibers in the mold;

(d) compressing the fibers into the mold to obtain the mold-defined preform; and (e) removing the mold-defined preform from the mold, wherein the mold-defined preform comprises from 1 to 10 percent by volume of fiber and wherein the mold-defined preform is in a shape selected from the group consisting of a ladle lip ring, a railroad tie and an I-beam.

6. A metal fiber reinforced cementitious composite made by infiltrating the preform of claim 1 with a cementitious composition, wherein the non-interstitial volume of the preform which is devoid of fibers remains free of cementitious composition after infiltration.

7. The cementitious composite of claim 6 wherein the preform is in a shape selected from the group consisting of a hollow cylinder, a ladle lip ring, a container and an I-beam.

* * * * *